(12) United States Patent
Vallee et al.

(10) Patent No.: US 10,711,743 B2
(45) Date of Patent: Jul. 14, 2020

(54) COVER FOR AN INTAKE HOUSING

(75) Inventors: Nicolas Vallee, Bazancourt (FR); Yoann Naudin, Saint Loup en Champagne (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 0 days.

(21) Appl. No.: 14/004,251

(22) PCT Filed: Feb. 13, 2012

(86) PCT No.: PCT/EP2012/052391
§ 371 (c)(1),
(2), (4) Date: Jan. 3, 2014

(87) PCT Pub. No.: WO2012/119835
PCT Pub. Date: Sep. 13, 2012

(65) Prior Publication Data
US 2014/0109857 A1 Apr. 24, 2014

(30) Foreign Application Priority Data
Mar. 10, 2011 (FR) .................................. 11 51989

(51) Int. Cl.
*F02M 35/10* (2006.01)
*F02B 29/04* (2006.01)
(Continued)

(52) U.S. Cl.
CPC ......... *F02M 35/10* (2013.01); *F02B 29/0462* (2013.01); *F28F 9/0268* (2013.01);
(Continued)

(58) Field of Classification Search
USPC ........ 123/198 E, 184.21; 165/157, 158, 159, 165/160, 161, 162, 163, 143, 144, 165,
(Continued)

(56) References Cited

U.S. PATENT DOCUMENTS 2,198,305 A * 4/1940 Crawford ............... B01D 45/10
261/103
2,684,690 A * 7/1954 Lee .......................... D21F 1/02
137/601.08
(Continued)

FOREIGN PATENT DOCUMENTS

DE 102009050258 B3 11/2010
FR 2906017 A1 3/2008
(Continued)

OTHER PUBLICATIONS

English Language abstract for DE 102009050258 extracted from espacenet.com database on Apr. 1, 2014, 12 pages.
(Continued)

*Primary Examiner* — Lindsay M Low
*Assistant Examiner* — Ruben Picon-Feliciano
(74) *Attorney, Agent, or Firm* — Howard & Howard Attorneys PLLC

(57) ABSTRACT

The invention relates to a cover (1) suitable for installation at least facing a heat exchanger (28) between a feed gas flow for an internal combustion engine and a so-called coolant, said heat exchanger (28) comprising a bundle (32) and an area (33) for distributing the coolant in the bundle (32), characterized in that the cover (1) comprises a protrusion (2) suitable for limiting the circulation of the feed gas flow at the coolant distribution area (33).

21 Claims, 2 Drawing Sheets

(51) Int. Cl.
*F28F 9/02* (2006.01)
*F28F 21/08* (2006.01)
*F28D 21/00* (2006.01)
*F28D 1/03* (2006.01)

(52) U.S. Cl.
CPC ............ *F28F 21/08* (2013.01); *F28D 1/0325* (2013.01); *F28D 2021/0082* (2013.01); *F28F 2265/10* (2013.01); *Y02T 10/146* (2013.01)

(58) Field of Classification Search
USPC ..... 165/166, 167, 168, 169, 170, 46, 47, 53, 165/72, 73, 74, 75, 98, 149, DIG. 211, 165/DIG. 213, DIG. 349, DIG. 340, 165/DIG. 93, DIG. 95, DIG. 96
See application file for complete search history.

(56) References Cited

U.S. PATENT DOCUMENTS

| | | | | |
|---|---|---|---|---|
| 2,875,986 | A * | 3/1959 | Holm | F28D 9/0068 159/28.6 |
| 3,525,391 | A * | 8/1970 | Day | F28D 9/0031 165/109.1 |
| 3,895,674 | A * | 7/1975 | Harris | F22B 1/063 122/34 |
| 4,038,191 | A * | 7/1977 | Davis | B01D 63/02 210/137 |
| 4,452,216 | A * | 6/1984 | Patchen, II | F02B 29/0462 123/545 |
| 4,596,287 | A * | 6/1986 | Wissmath | F24D 3/16 165/166 |
| 7,882,827 | B2 | 2/2011 | Grünenwald et al. | |
| 8,720,536 | B2 * | 5/2014 | Vaughn et al. | 165/174 |
| 2005/0061486 | A1 * | 3/2005 | Yang | F28D 15/0208 165/104.33 |
| 2006/0278377 | A1 | 12/2006 | Martins et al. | |
| 2008/0314062 | A1 * | 12/2008 | Ritchey | 62/291 |
| 2011/0088663 | A1 | 4/2011 | Dehnen et al. | |
| 2011/0168366 | A1 | 7/2011 | Garret et al. | |
| 2013/0074814 | A1 * | 3/2013 | Schatz | F28F 3/025 123/568.12 |

FOREIGN PATENT DOCUMENTS

| | | | | |
|---|---|---|---|---|
| GB | | 1413473 A * | 11/1975 | ............ F28D 17/04 |
| WO | WO 20051001272 A1 | | 1/2005 | |
| WO | WO 20081003074 A2 | | 1/2008 | |
| WO | WO 20091156365 A1 | | 12/2009 | |
| WO | WO 20101146063 A1 | | 12/2010 | |
| WO | WO 2012/119834 A1 | | 9/2012 | |

OTHER PUBLICATIONS

English Language abstract for FR 290617 and machine assisted translation extracted from espacenet.com database on Apr. 2, 2014, 37 pages.

English Language abstract for WO 2005/001272 extracted from espacenet.com database on Apr. 1, 2014, 45 pages.

English Language abstract for WO 2009/156365 extracted from espacenet.com database on Apr. 1, 2014, 27 pages.

English Language abstract for WO 2010/146063 and machine assisted translation extracted from espacenet.com database on Apr. 1, 2014, 40 pages.

PCT International Search Report for PCT/EP2012/052390, dated Mar. 16, 2012, 5 pages.

PCT International Search Report for PCT/EP2012/052391, dated Mar. 26, 2012, 7 pages.

U.S. Appl. No. 14/004,267, filed Sep. 10, 2013, "Intake Housing Including a Heat Exchanger", 13 pages. This is the English Language Appln. equivalent to WO 2012/119834.

* cited by examiner

COVER FOR AN INTAKE HOUSING

RELATED APPLICATIONS

This application claims is the National Stage of International Patent Application No. PCT/EP2012/052391, filed on Feb. 13, 2012, which claims priority to and all the advantages of French Patent Application No. FR 1151989, filed on Mar. 10, 2011, the content of which is incorporated herein by reference.

The invention relates to a cover for an intake housing for a feed gas flow of an internal combustion engine, an intake housing of an internal combustion engine and a feed gas flow intake module, provided with such a cover. A gas should be understood to be air or a mixture of air and exhaust gas.

The invention will be particularly applicable as an integral part of a gas intake device, for the introduction of said gases into the cylinder head of a motor vehicle internal combustion engine.

BACKGROUND

A motor vehicle internal combustion engine comprises a plurality of combustion chambers each delimited by a piston, a cylinder and a portion of a cylinder head. These combustion chambers receive a mixture of oxidant and fuel destined to be burnt to generate the work of the engine. The oxidant comprises air, which may or may not be compressed, depending on whether the engine includes a turbocharger. The air may also be mixed with exhaust gases, called recirculated exhaust gases. The gases taken into the combustion chamber will hereinafter be referred to as feed gas.

It is known practice to increase the density of these feed gases by cooling them, for example by promoting a heat exchange between the feed gases and a flow of air outside the vehicle via an air/air heat exchanger.

It is also known practice to produce this cooling by exchange between the feed gases and a liquid fluid, for example the coolant of the engine, which circulates in a heat exchanger which is passed through by the feed gases. The heat exchanger used in the latter device comprises a bundle, but it also includes a coolant distribution area whose function is to direct the fluid from ducts, external to the exchanger, to tubes that make up the bundle.

SUMMARY OF THE INVENTION

The effectiveness of such a solution depends on the use made of the front surface of the bundle of the exchanger and on the distribution of the quantity of feed gas over all of this surface. The presence of the coolant distribution area in the intake module degrades the exchange efficiency between the coolant and the feed gases. The overall effectiveness of such a feed gas cooling device is thus affected.

The aim of the present invention is therefore to resolve the abovementioned drawback, mainly by limiting or by preventing the circulation of the feed gases at the coolant distribution area of the exchanger. Such a limiting is applied by simple means that can be readily industrialized, by forming, on the cover, a part intended to channel the feed gases out of the coolant distribution area of the exchanger. Guidance of the feed gas flow to the bundle of the heat exchanger is also promoted.

The subject of the invention is therefore a cover suitable for installation at least facing a heat exchanger between a feed gas flow of an internal combustion engine and a so-called coolant, said heat exchanger comprising a bundle and an area for distributing the coolant in the bundle, characterized in that the cover comprises a protrusion suitable for limiting the circulation of the feed gas flow at the coolant distribution area. The protrusion forms an obstacle, arranged facing the coolant distribution area, which blocks the feed gas flow and directs the latter toward the bundle of the exchanger.

According to a first feature of the invention, the protrusion has a feed gas flow deflection function.

According to a second feature of the invention, the cover comprises a feed gas flow inlet orifice and a feed gas flow outlet orifice joined by a wall, and in which the protrusion extends in a plane parallel to a plane of extension of the outlet orifice.

According to another feature of the invention, the protrusion delimits both the inlet orifice and the outlet orifice.

According to yet another feature of the invention, the cover comprises a docking edge suitable for bearing against an intake housing in which the heat exchanger is housed, the protrusion extending from the docking edge.

Such an extension of the protrusion is advantageously produced in the extension of the docking edge.

According to this variant, the cover is produced by means of a casting step. In other words, the cover is manufactured from a blank produced by a casting method.

According to yet another feature of the invention, the cover comprises a metal plate provided with an inlet orifice-forming opening, said protrusion being obtained from said metal plate.

Advantageously, the protrusion originates from an edge of the inlet orifice and is formed by folding a portion of the metal plate which initially blocks the inlet orifice.

Also advantageously, the folding of the protrusion is arranged so that an end of the protrusion can come into contact with the heat exchanger.

According to a feature of this embodiment of the invention, the cover is produced by means of a swaging step. In other words, the cover comprises at least one step of forming of the metal plate produced by swaging.

According to a solution common to the variants described above, the cover comprises two longitudinal ends and the protrusion is produced at only one of the two ends.

The invention also targets an intake housing of an internal combustion engine suitable for receiving a heat exchanger between a feed gas flow circulating in the housing and a fluid, said intake housing comprising a cover produced according to any one of the features described above.

Finally, the invention covers an air intake module of an internal combustion engine comprising an intake housing as mentioned above and a heat exchanger provided in said intake housing.

A very first advantage according to the invention lies in the increase in the heat exchange efficiency between the feed gas flow and the fluid which circulates in the heat exchanger.

Another advantage lies in the simplicity with which the means which limits the circulation of feed gas at the coolant distribution area of the exchanger can be produced. In practice, this means is incorporated in the cover so that its installation requires no additional action.

BRIEF DESCRIPTION OF THE DRAWINGS

Other features, details and advantages of the invention will become more clearly apparent on reading the following description given as an indication together with the drawings in which.

DETAILED DESCRIPTION

Figure 1:
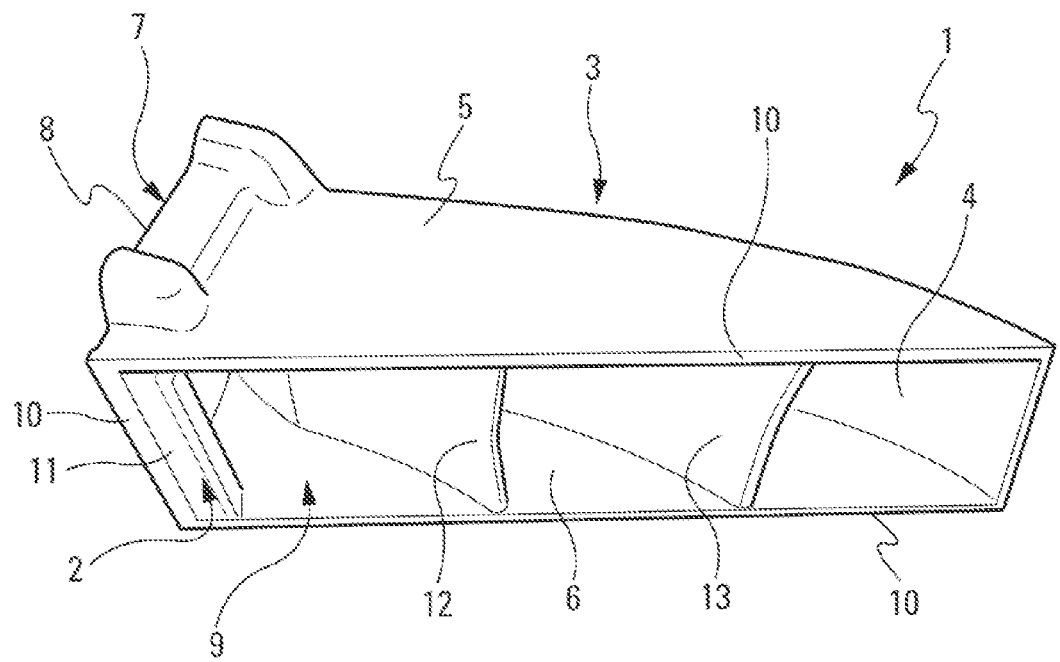
FIG. 1 is a perspective view of a first variant embodiment of the cover according to the invention.

FIG. 1 illustrates a cover 1 of an intake housing of an internal combustion engine. Such a housing receives a heat exchanger which is passed through by a flow of feed gas circulating in the housing. The main function of this heat exchanger is to cool the feed gases prior to their entry into the combustion chambers of the internal combustion engine.

The cover 1 channels the feed gas flow toward a front face of the heat exchanger, but the cover according to the invention can also be arranged at the outlet of the heat exchanger, that is to say, to channel the feed gas flow after it has been cooled by the heat exchanger. The description that follows will be given in relation to a channeling, or a guiding, toward the front face of the exchanger, but it goes without saying that this description is applicable to the use of the cover at the outlet of the heat exchanger.

This cover 1 is intended to be mounted at least facing the heat exchanger, more particularly facing an inlet front face of this heat exchanger. The cooling of the gas flow is obtained by a heat transfer between this flow and a so-called coolant which circulates at the core of the heat exchanger. This fluid is, for example, a coolant which circulates in a cooling loop of the engine installed in the vehicle. Such a loop or a cooling circuit participates in the thermal conditioning of the internal combustion engine installed in the vehicle.

The heat exchanger comprises a bundle and an area for distributing the coolant in the bundle. The bundle is the portion devoted to the heat exchange between the feed gas flow and the coolant and it comprises a plurality of tubes, for example formed by pairs of plates attached together, between which are installed separators, said separators promoting the heat exchange between the feed gas flow circulating between the tubes and the coolant circulating in the tubes. This bundle receives the coolant from the coolant distribution area, the latter also being called exchanger collecting box. The coolant distribution area has a series of shoulders, for example, raised together and in which circulates the coolant to reach the tubes of the bundle. Such a heat exchanger will be described in more detail in FIG. 4.

The cover 1 comprises a protrusion 2 designed to limit the circulation of the feed gas flow at the coolant distribution area. In other words, this protrusion 2 is installed on the cover 1 so as to deflect the feed gas flow in order for the latter not to pass at the coolant distribution area. Correlatively, such a deflection applied by the protrusion 2 favors the use of the bundle.

According to the first variant, the cover 1 is obtained from a part produced from a casting method. The material that makes up this part is here an aluminum or an aluminum alloy. The cover 1 comprises a wall 3, also called jacket, which delimits an internal volume in which the feed gas flow circulates. This wall 3 comprises a bottom 4 at the edges of which extend a first lateral wall 5 and a second lateral wall 6. The bottom follows a curvilinear profile whereas the first lateral wall 5 and the second lateral wall 6 are planar and cut with a taper in order to match the curvilinear profile of the bottom 4.

The first lateral wall 5, the second lateral wall 6 and the bottom 4 delimit an inlet orifice 7 for the feed gas flow. This inlet orifice 7 is an aperture surrounded by a link edge 8, the latter forming an integral part of the first lateral wall 5, the second lateral wall 6 and the bottom 4. The inlet orifice 7 is formed at a first end of the cover whereas the opposite end of the cover, called second end, is terminated with a taper in order to force the direction of the feed gas flow toward the heat exchanger. These ends are qualified hereinbelow as longitudinal because they terminate the cover in the length thereof.

An outlet orifice 9 is surrounded peripherally by a docking edge 10, the latter being formed all along the free end of the first lateral wall 5, the second lateral wall 6 and the bottom 4. This docking edge 10 is the structural element of the cover 1 which bears against the intake housing in which the heat exchanger is housed. This docking edge 10 receives, for example, a weld bead to seal and mechanically link the cover 1 with the intake housing.

The outlet orifice 9 is thus formed by an open-worked sector which extends in a plane passing through the docking edge 10. The protrusion 2 is, for example, produced to extend into the outlet orifice 9. According to a variant embodiment, the protrusion 2 is formed by a rectilinear rule with a plane of extension that is parallel to the plane of the outlet orifice 9. This rule or rib thus encroaches onto the area of the outlet orifice 9 delimited by the docking edge 10. In a complementary manner, the invention provides for an outer face 11 of the protrusion 2, that is to say the face turned toward the heat exchanger, to extend in a plane which is merged with the plane of the outlet orifice 9. It will thus be understood that the protrusion 2 is produced in the extension of the docking edge 10, that is to say of the same material as this edge, toward the open section defining the outlet orifice 9.

In this variant, the protrusion 2 is produced only at one of the two longitudinal ends of the cover 1 because the heat exchanger comprises only a single coolant distribution area. It goes without saying that a cover 1 equipped with a plurality of protrusions 2 arranged to limit the circulation of the feed gas at a plurality of coolant distribution areas is covered by the invention. Similarly, the position of the protrusion 2 is not limited to an end of the cover 1. In practice, this protrusion may be derived from the first lateral wall and extend to the second lateral wall, but separated from the longitudinal ends.

In the first variant illustrated in FIG. 1, it will be noted that the protrusion 2 extends both into the outlet orifice 9 but also into the inlet orifice 7. In other words, the protrusion 2 overlaps the docking edge 10 on the side of the outlet orifice 9 whereas it defines the link edge 8 of the inlet orifice 7.

Inside the internal volume of the cover 1 delimited by the first lateral wall 5, the second lateral wall 6 and the bottom 4, at least one means for guiding the gas flow circulating in the cover 1 extends. This means notably takes the form of at least one blade 12 which extends between the first lateral wall 5 and the second lateral wall 6, at a distance from the bottom 4. This blade acts as a deflector which changes the direction of the feed gas flow in order to favor its input into the bundle of the heat exchanger. It will be noted that FIG. 1 shows a first blade referenced 12 and a second blade referenced 13, where the second blade 13 extends in the internal volume of the cover at least partially between the first blade 12 and the bottom 4, without in any way coming into contact with these two elements.

Figure 2:
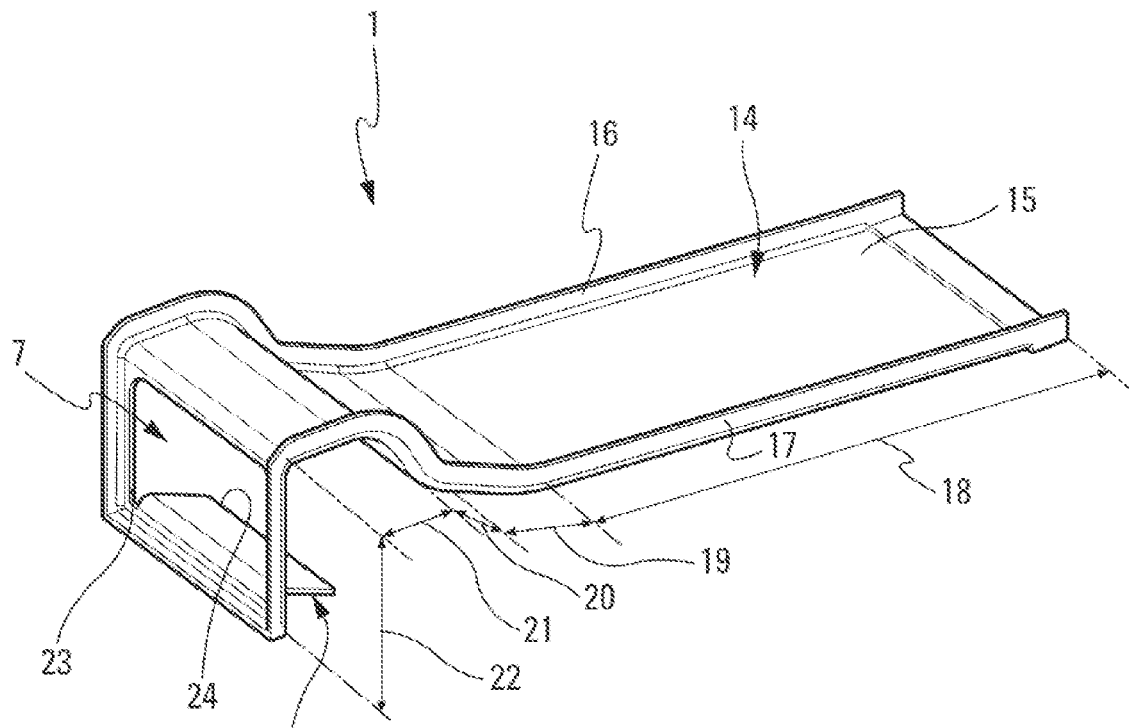
FIG. 2 is a perspective view of a first embodiment of a second variant of the cover according to the invention.

FIG. 2 shows a first embodiment of a second variant of the cover 1 according to the invention.

This cover 1 is here produced from a metal plate or strip 14, notably of aluminum or of aluminum alloy. This metal plate 14 is shaped by a swaging method. It comprises a central strip 15 of substantially parallelepipedal form and two flanks referenced 16 and 17 which extend in the length of the central strip 15. These flanks 16 and 17 extend in a plane perpendicular to the plane of extension of the central strip. They are, for example, produced by a folding operation, or during the swaging operation.

The metal plate 14 is provided with an aperture which forms the inlet orifice 7. This aperture is produced in the central strip at an end thereof.

The cover 1 has a series of sectors that are folded relative to one another. A first sector 18 begins at a longitudinal end of the cover and extends in a first plane. This first sector 18 is continued by a second sector 19 which extends in a second plane that is inclined relative to the first plane by an angle of between, for example, 20 and 30°, by a fold in the anti-trigonometric direction. Following the second sector 19, there is a third sector 20 which extends in a third plane that is inclined relative to the second plane by an angle of between, for example, 20 and 30°, by a fold in the anti-trigonometric direction.

The cover 1 is continued by a fourth sector 21 which extends in a fourth plane that is inclined relative to the third plane by an angle of between, for example, 40 and 60°, by a fold in the trigonometric direction. In such a situation, the fourth plane is notably parallel to the first plane. Finally, the cover ends with a fifth sector 21 which extends in a fifth plane that is orthogonal to the fourth plane, by a fold in the trigonometric direction.

The inlet orifice 7 is produced more specifically through the fifth sector and occupies all of the area of this fifth sector 22. This inlet orifice 7 is then delimited by an edge 23 which peripherally surrounds the aperture forming the inlet orifice 7.

The protrusion 2 is derived from the metal plate 14 in as much as it is a portion of the central strip 15 which forms the protrusion 2. This protrusion 2 then performs its function of limiting the circulation of the feed gas flow by a folding of a plate portion which, before the inlet orifice 7 is cut, occupies the fifth sector 22. In other words, the material usually removed from the cover 1 to create the inlet orifice 7 is exploited to produce the protrusion 2 which blocks the circulation of the feed gas flow at the coolant distribution area of the heat exchanger.

The protrusion 2 is thus attached to the edge 23 of the inlet orifice 7 and also comprises a free end 24 which is situated between the two longitudinal ends of the cover 1. Advantageously, the protrusion 2 is folded in such a way that this free end 24 comes into contact with the heat exchanger, and more particularly with the front face of the heat exchanger. There is thus a guarantee that the feed gas flow cannot return toward the coolant distribution area of the heat exchanger owing to a gap between the protrusion and the latter. The protrusion 2 then extends in a plane that is inclined relative to the fifth segment 22, by an angle of between 90° and 100° and folded in the anti-trigonometric direction.

Figure 3:
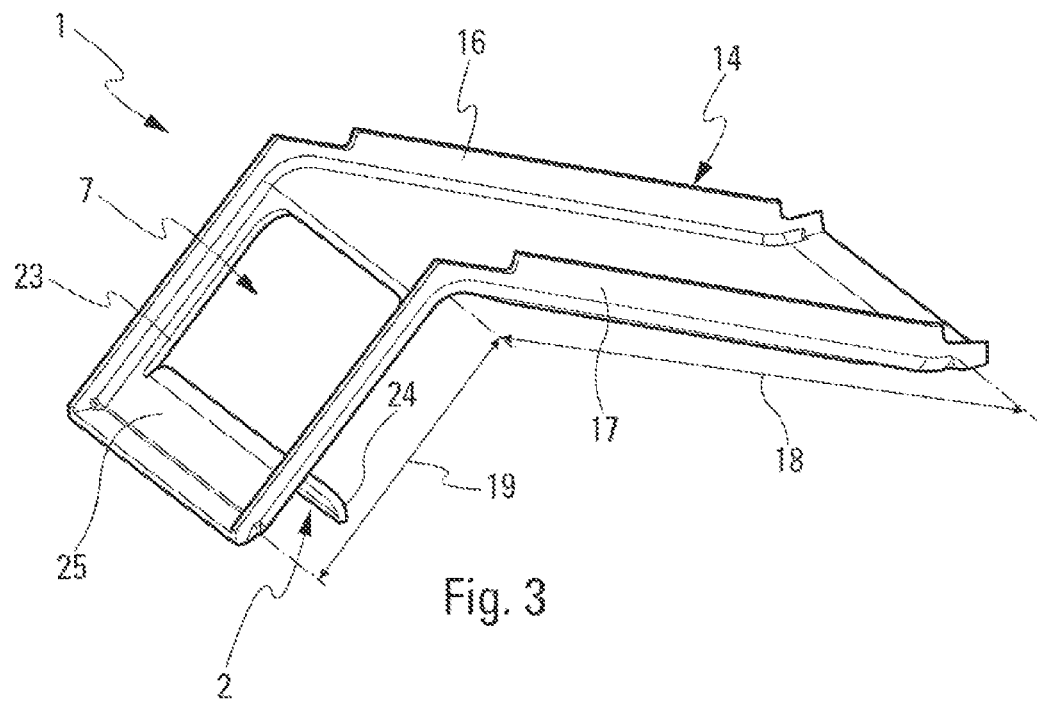
FIG. 3 is a perspective view of a second embodiment of the second variant embodiment of the cover according to the invention.
Figure 4:
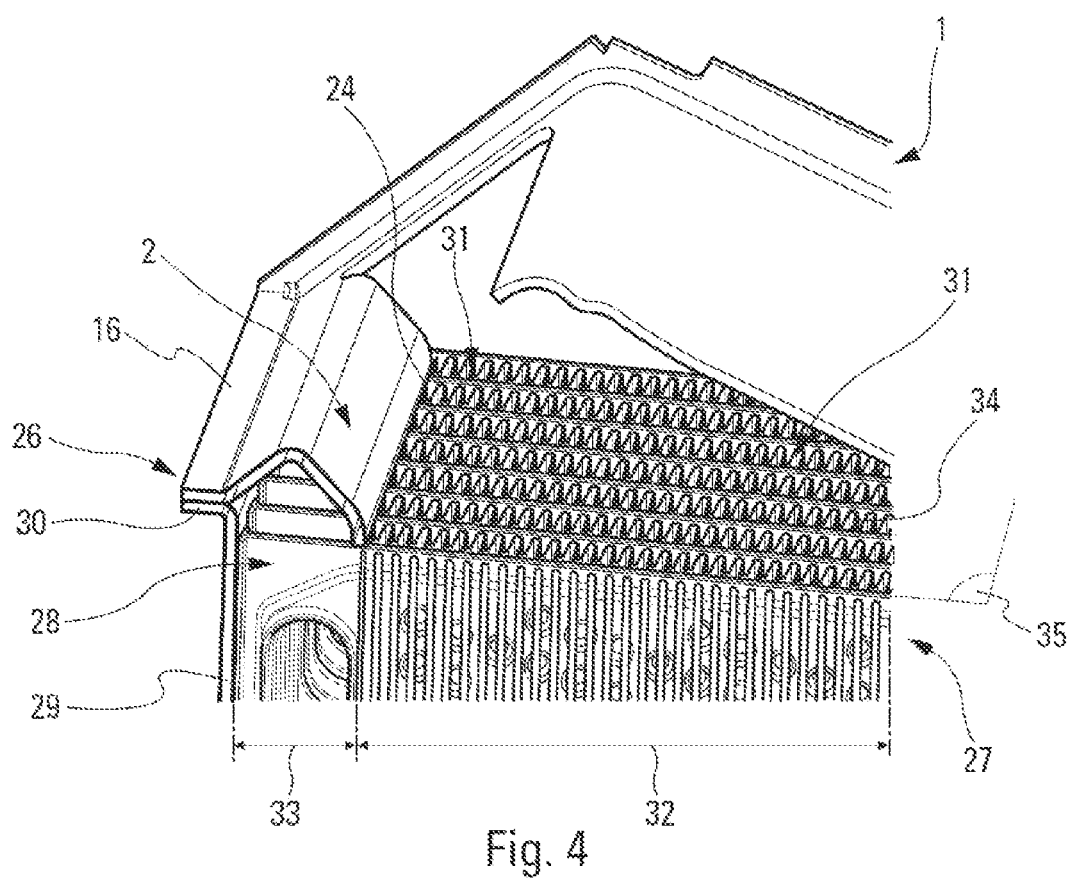
FIG. 4 is a partial perspective view of the air intake module incorporating the cover illustrated in FIG. 3.

Such an arrangement allows the protrusion 2 to fulfill an additional function, which applies in the two embodiments of the second variant (FIGS. 2 to 4). In practice, the protrusion 2 acts also a deflector of the feed gas flow, favoring its guidance toward the bundle of the heat exchanger, and more particularly toward the portion of the bundle situated in line with the first sector 15.

FIG. 3 illustrates a second embodiment of the second variant embodiment of the cover 1.

This second embodiment is manufactured from a metal plate 14 which has the first sector 18 beginning at a longitudinal end of the cover. This first sector 18 extends in a first plane and is continued by a second sector 19 which extends in a second plane that is inclined relative to the first plane by an angle of between, for example, 40 and 90°, by a fold in the trigonometric direction. The cover 1 then has a generally "L" shape.

The central strip 15 is edged by the flanks 16 and 17, the latter extending both on the first and the second sector, respectively, referenced 18 and 19.

The inlet orifice 7 is formed through the second sector 19 but only partially occupies the area covered by the second sector 19. In other words, there is a band 25 which extends between the longitudinal end of the cover 1 and the edge 23 delimiting the inlet orifice 7 from which the protrusion 2 originates. The latter extends in a plane that is inclined relative to the second sector 19 by an angle of between 80° and 100°. The free end 24 of the protrusion 2 comprises a specific feature in as much as the end of the protrusion is slightly folded in the anti-trigonometric direction.

FIG. 4 partially shows the intake housing 26 and the intake module 27 which both incorporate the cover 1 according to the invention.

The intake housing 26 guides or channels the feed gas flow toward an internal combustion engine. This intake housing 26 is adapted to receive the heat exchanger, here referenced 28. This intake housing 26 comprises at least one casing 29 and one cover 1 according to the invention. The casing 29 is arranged at least at each end of the heat exchanger 28 and has a folded edge 30 which cooperates with the flank 16 of the cover 1. The seal-tightness at this folded edge 30 and this flank 16 is produced for example by a weld bead.

The intake module 27 comprises the intake housing 26 and the heat exchanger 28. This module 27 thus forms a standalone assembly that is ready to be installed in a vehicle.

The heat exchanger 28 is partly represented. It comprises a plurality of tubes 31 each produced by a pair of plates attached one against the other. A passage between these plates defines the circulation of the coolant in the bundle 32. The plane which passes through the top edge of each tube defines the front face 35 of the heat exchanger 28, this face being the first to be passed through by the feed gas flow in the direction of circulation thereof in the intake module 27.

The heat exchanger 28 also comprises the coolant distribution area 33 where the coolant is channeled to be distributed to each tube of the bundle 32. Between each tube 24, there is a separator 34 of corrugated form, the function of which is to promote the heat transfer between the coolant and the feed gas flow circulating in the intake module 27.

The protrusion 2 formed on the cover 1 is positioned facing the coolant distribution area 33. It thus prevents or blocks any circulation of the feed gas flow in the coolant distribution area 33 in favor of the bundle 32. The protrusion 2 delimits, at least partly, a working surface of the front face 35 of the exchanger corresponding to the area of the exchanger that is most efficient in heat exchange terms.

The folding and the length of the protrusion 2 are carried out in such a way that the free end 24 is positioned in contact with the junction of the bundle 32 with the coolant distribution area 33 of the heat exchanger 28.

The invention claimed is:

1. A cover (1) suitable for installation at least facing a heat exchanger (28) between a feed gas flow of an internal combustion engine and a so-called coolant, the heat exchanger (28) comprising a bundle (32) and a coolant distribution area (33) for distributing the coolant in the bundle (32), wherein the cover (1) comprises a protrusion (2) suitable for limiting the circulation of the feed gas flow at the coolant distribution area (33); and wherein the cover (1) further comprises first and second longitudinal ends, wherein the protrusion (2) is disposed at the first longitudinal end and extends therefrom,
wherein the cover further comprises a gas flow inlet orifice (7) and a gas flow outlet orifice (9) joined by a wall (3) and in which a portion of the protrusion (2) extends in a plane parallel to a plane of extension of the outlet orifice (9), and the protrusion (2) originates at an origin of the inlet orifice (7), forms a portion of the inlet orifice (7), and has an opposite free end (24) disposed between the first and second longitudinal ends;
wherein the free end (24) of the protrusion (2) of the cover (1) contacts the bundle (32) of the heat exchanger (28); and
wherein the cover further comprises a central strip (15) of substantially parallelepipedal form, a portion of which forms the protrusion (2), and two flanks (16, 17) which extend on either side of the central strip (15).

2. The cover as claimed in claim 1, in which the protrusion (2) has a gas flow deflection function.

3. The cover as claimed in claim 2, comprising a gas flow inlet orifice (7) and a gas flow outlet orifice (9) joined by a wall (3) and in which the protrusion (2) extends in a plane parallel to a plane of extension of the outlet orifice (9).

4. The cover as claimed in claim 3, in which the protrusion (2) delimits both the inlet orifice (7) and the outlet orifice (9).

5. The cover as claimed in claim 2, comprising a metal plate (14) provided with an inlet orifice-forming opening (7), the protrusion (2) being obtained from said metal plate (14).

6. The cover as claimed in claim 5, in which the protrusion (2) originates on an edge (23) of the inlet orifice (7) and is formed by folding a portion of the metal plate (14) which initially blocks the inlet orifice (7).

7. An intake housing (26) for an internal combustion engine suitable for receiving a heat exchanger (28) between a feed gas flow circulating in the housing and a fluid, the intake housing (26) comprising a cover (1) as claimed in claim 6.

8. An intake housing (26) for an internal combustion engine suitable for receiving a heat exchanger (28) between a feed gas flow circulating in the housing and a fluid, the intake housing (26) comprising a cover (1) as claimed in claim 2.

9. The cover as claimed in claim 1, in which the protrusion (2) delimits both the inlet orifice (7) and the outlet orifice (9).

10. The cover as claimed in claim 1, comprising a docking edge (10) suitable for bearing against an intake housing (26) where the heat exchanger (28) is housed, in which the protrusion (2) extends from the docking edge (10).

11. The cover as claimed in claim 10, in which the protrusion (2) extends in the extension of the docking edge (10).

12. The cover as claimed in claim 1, produced by means of a casting step.

13. The cover as claimed in claim 1, comprising a metal plate (14) provided with an inlet orifice-forming opening (7), the protrusion (2) being obtained from the metal plate (14).

14. The cover as claimed in claim 13, in which the protrusion (2) originates on an edge (23) of the inlet orifice (7) and is formed by folding a portion of the metal plate (14) which initially blocks the inlet orifice (7).

15. The cover as claimed in claim 14, in which the folding of the protrusion (2) is arranged so that the free end (24) of the protrusion (2) can come into contact with the heat exchanger (28).

16. The cover as claimed in claim 13, produced by means of a swaging step.

17. An intake housing (26) for an internal combustion engine suitable for receiving a heat exchanger (28) between a feed gas flow circulating in the housing and a fluid, the intake housing (26) comprising a cover (1) as claimed in claim 1.

18. An air intake module (27) for an internal combustion engine comprising an intake housing (26) as claimed in claim 17 and a heat exchanger (28), provided in the intake housing (26).

19. The cover as claimed in claim 1, wherein the central strip has a substantially parallelepipedal form.

20. A cover (1) suitable for installation at least facing a heat exchanger (28) between a feed gas flow of an internal combustion engine and a so-called coolant, the heat exchanger (28) comprising a bundle (32) and a coolant distribution area (33) for distributing the coolant in the bundle (32), wherein the cover (1) comprises:
an inlet orifice (7) formed in the cover (1); the inlet orifice (7) disposed at a first end of the cover (1); an outlet orifice (9) formed in the cover (1) and defining a plane of extension; the outlet orifice (9) separated from the inlet orifice (7) by a wall (3); and
a protrusion (2) suitable for limiting the circulation of the feed gas flow at the coolant distribution area (33), wherein the cover (1) further comprises first and second longitudinal ends, wherein the protrusion (2) is disposed at the first longitudinal end and a portion of the protrusion (2) extends therefrom into the plane of extension of the outlet orifice (9), and the protrusion (2) originates at an origin of the inlet orifice (7), forms a portion of the inlet orifice (7), and has an opposite free end (24) disposed between the first and second longitudinal ends; and
wherein the free end of the protrusion (2) of the cover (1) contacts the bundle (32) of the heat exchanger (28); and
wherein the cover further comprises a central strip (15) of substantially parallelepipedal form, a portion of which forms the protrusion (2), and two flanks (16, 17) which extend on either side of the central strip (15).

21. An air intake module (27) for an internal combustion engine comprising:
an intake housing (26) including a casing (29) and the cover (1), as claimed in claim 20, disposed on the casing (29); and
the heat exchanger (28) provided in the intake housing (26); the heat exchanger (28) including the bundle (32) and the coolant distribution area (33) in fluid communication with the bundle (32).

* * * * *